(12) United States Patent
Sakamoto et al.

(10) Patent No.: US 7,473,386 B2
(45) Date of Patent: Jan. 6, 2009

(54) MOLD FOR TIRE

(75) Inventors: Masayuki Sakamoto, Tambon Bung Sriracha (TH); Ryo Ono, Shirakawa (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/605,252

(22) Filed: Nov. 29, 2006

(65) Prior Publication Data

US 2007/0134356 A1    Jun. 14, 2007

(30) Foreign Application Priority Data

Dec. 14, 2005  (JP) .............................. 2005-359739

(51) Int. Cl.
*B29C 35/02*  (2006.01)
(52) U.S. Cl. .................... 264/315; 264/326; 425/36; 425/43
(58) Field of Classification Search ................ 425/36, 425/43; 264/315, 326
See application file for complete search history.

(56) References Cited

U.S. PATENT DOCUMENTS

| | | | |
|---|---|---|---|
| 3,171,162 A * | 3/1965 | Soderquist ................ 425/36 |
| 4,029,449 A * | 6/1977 | Longaberger ............. 425/36 |
| 4,045,150 A * | 8/1977 | Gazuit .................... 425/36 |
| 4,070,436 A * | 1/1978 | Gardner et al. ........... 425/36 |
| 4,573,894 A * | 3/1986 | Blayne et al. ............. 425/36 |
| 4,582,470 A * | 4/1986 | Sarumaru ................. 425/36 |
| 6,277,317 B1 * | 8/2001 | Vannan et al. ............ 425/36 |
| 6,398,533 B1 | 6/2002 | Hanya et al. |
| 6,896,836 B2 * | 5/2005 | Matsunaga et al. ........ 425/36 |
| 2003/0141627 A1 | 7/2003 | Girard |

FOREIGN PATENT DOCUMENTS

| | | |
|---|---|---|
| EP | 1 066 940 A2 | 1/2001 |
| JP | 10-119053 | 5/1998 |
| JP | 2003-236841 A | 8/2003 |

\* cited by examiner

*Primary Examiner*—James Mackey
(74) *Attorney, Agent, or Firm*—Birch, Stewart, Kolasch & Birch, LLP

(57)    ABSTRACT

A mold (22) includes a bead ring (32). The bead ring (32) includes a side forming surface (34), a bottom forming surface (36), a support surface (38) for a bladder, and a guide surface (40) for a bladder. The support surface (38) is positioned on an inside in a radial direction of the bottom forming surface (36). The support surface (38) is extended in the radial direction. A distance (L2) of the support surface (38) is equal to or smaller than 5.0 mm in the radial direction. The guide surface (40) is positioned on an inside in the radial direction and an outside in an axial direction from the support surface (38). The guide surface (40) is inclined inward in the axial direction from the inside in the radial direction toward an outside in the radial direction. An angle θ of the guide surface (40) to the radial direction is equal to or greater than 15 degrees and is equal to or smaller than 75 degrees. In an expansion, a bladder (B) is erected by the guide surface (40). By a further expansion, the bladder (B) is supported by the support surface (38).

3 Claims, 11 Drawing Sheets

(a)

(b)

MOLD FOR TIRE

This application claims priority on Patent Application No. 2005-359739 filed in JAPAN on Dec. 14, 2005, the entire contents of which are hereby incorporated by reference.

BACKGROUND OF THE INVENTION

1. Field of the Invention

The present invention relates to a mold to be used for manufacturing a pneumatic tire. In detail, the present invention relates to an improvement of a bead ring of the mold.

2. Description of the Related Art

A two phase mold is used at a step of vulcanizing a pneumatic tire. FIG. 9 is a sectional view showing a part of a conventional two phase mold 2 together with a green tire G and a bladder B. The two phase mold 2 comprises a tread segment 4, a side plate 6 and a bead ring 8. The bead ring 8 includes an inner peripheral surface 10 and a bottom forming surface 12. At the vulcanizing step, first of all, the green tire G formed previously is put into the opened mold 2. Next, the mold 2 is closed. Then, the bladder B is filled with a high-temperature gas. The bladder B expands along the inner peripheral surface 10 and a cavity is formed by the mold 2 and the bladder B. The green tire G is simultaneously pressurized and heated in the cavity. By the pressurization and the heating, a rubber composition flows. A rubber causes a crosslinking reaction by the heating so that a tire is obtained. A bead is formed by the bead ring 8 and the bladder B. Such a mold 2 has been disclosed in U.S. Pat. No. 6,398,533 (Japanese Laid-Open Patent Publication No. 2001-9840).

In some cases, an end E of the green tire G is caught on a boundary 16 between the inner peripheral surface 10 and the bottom forming surface 12 as shown in FIG. 10 when the green tire G is put into the mold 2. By the expansion of the bladder B, the end E is pushed outward in an axial direction as shown in an arrow A1 and is moved toward the bottom forming surface 12. At this time, the rubber composition is interposed between the bladder B and the inner peripheral surface 10 in some cases. The rubber composition is interposed so that a tongue-shaped portion To is formed on a toe side of a bead Be as shown in FIG. 11. This phenomenon is referred to as a "long toe". In case of a tire comprising a rubber chafer (a chafer in which a fabric is not used), a rubber composition flows more easily than a tire comprising a canvas chafer (a chafer formed by a fabric impregnated with a rubber). For this reason, the tongue-shaped portion To is formed easily. The tongue-shaped portion To deteriorates an appearance and quality of the tire. The tongue-shaped portion To having a large dimension is to be removed. A removing work is carried out manually by using a knife. For the removing work, a great deal of time and labor is required.

If a thickness of the end E of the green tire G is set to be small, the generation of the tongue-shaped portion To can be suppressed. In some cases, however, an insufficiency of a volume of the bead Be is generated by the thin end E. This phenomenon is referred to as a "smash". In the tire having the smash generated thereon, an air seal of a bead and a rim is not sufficient. In the tire, the thickness of the bead is insufficient. For this reason, there is also a possibility that the bead might be damaged when the tire is incorporated into the rim. In the tire, furthermore, a position of a bead core for each section is varied. The variation inhibits a uniformity of the tire. The same problem is also generated in a tire obtained by a two piece mold. It is an object of the present invention to provide a mold by which a tire of high quality can be obtained.

SUMMARY OF THE INVENTION

A mold for a tire according to the present invention comprises a bead ring. The bead ring includes a bottom forming surface for abutting on a bead bottom to determine a shape of the bead bottom, a support surface for a bladder which is positioned on an inside in a radial direction from the bottom forming surface, and a guide surface for a bladder which is positioned on an inside in the radial direction and an outside in an axial direction from the support surface for a bladder. A distance of the support surface is equal to or smaller than 5.0 mm in the radial direction.

In the mold, the bladder expands along the guide surface. When the bladder and the green tire come in contact with each other, therefore, the bladder is erected on a contact point. Furthermore, the bladder expands so that the green tire is pushed outward in the radial direction. In the mold, the green tire can be prevented from being pushed outward in the axial direction by the bladder. By the mold, a tongue-shaped portion can be prevented from being generated.

It is preferable that the guide surface should be inclined inward in the axial direction from the inside in the radial direction toward an outside in the radial direction. An angle of the guide surface to the radial direction is equal to or greater than 15 degrees and is equal to or smaller than 75 degrees.

It is preferable that a distance of the guide surface should be equal to or greater than 5 mm. It is preferable that a ratio (W1/W2) of a width W1 of the bottom forming surface in an axial direction to a width W2 of a core of the bead in the axial direction should be equal to or lower than 2.5.

A method of manufacturing a tire according to the present invention comprises the steps of:

(1) putting a green tire into a mold including a bead ring having a bottom forming surface for abutting on a bead bottom to determine a shape of the bead bottom, a support surface for a bladder which is positioned on an inside in a radial direction from the bottom forming surface, and a guide surface for a bladder which is positioned on an inside in the radial direction and an outside in an axial direction from the support surface for a bladder, and having a distance of the support surface which is equal to or smaller than 5.0 mm in the radial direction; and (2) pressurizing and heating the green tire in a cavity surrounded by the mold and the bladder, thereby forming a bead through the bead ring.

DESCRIPTION OF THE PREFERRED EMBODIMENTS

The present invention will be described below in detail based on a preferred embodiment with reference to the drawings.

Figure 1:
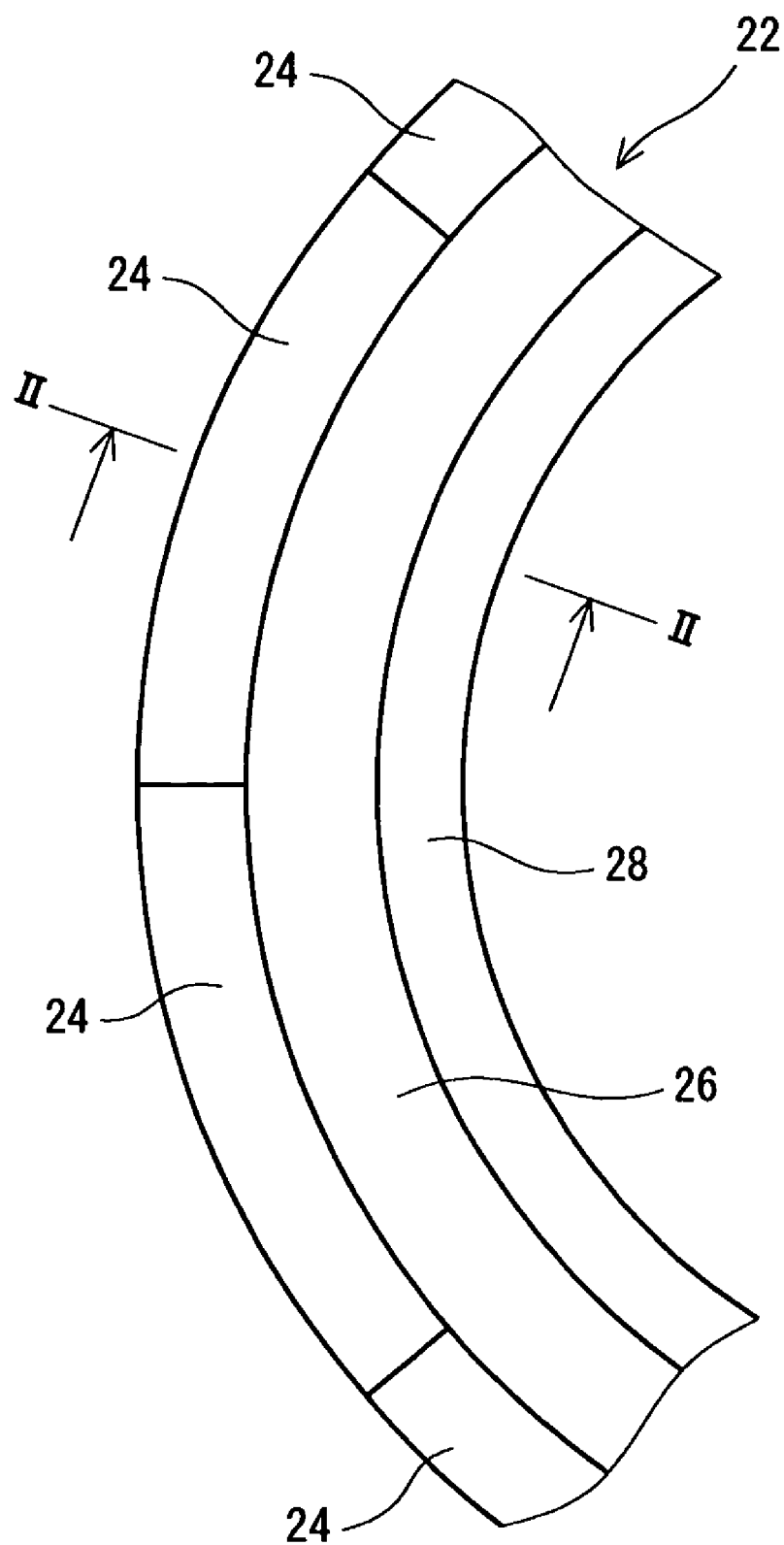
FIG. 1 is a plan view showing a mold for a tire according to an embodiment of the present invention.
Figure 2:
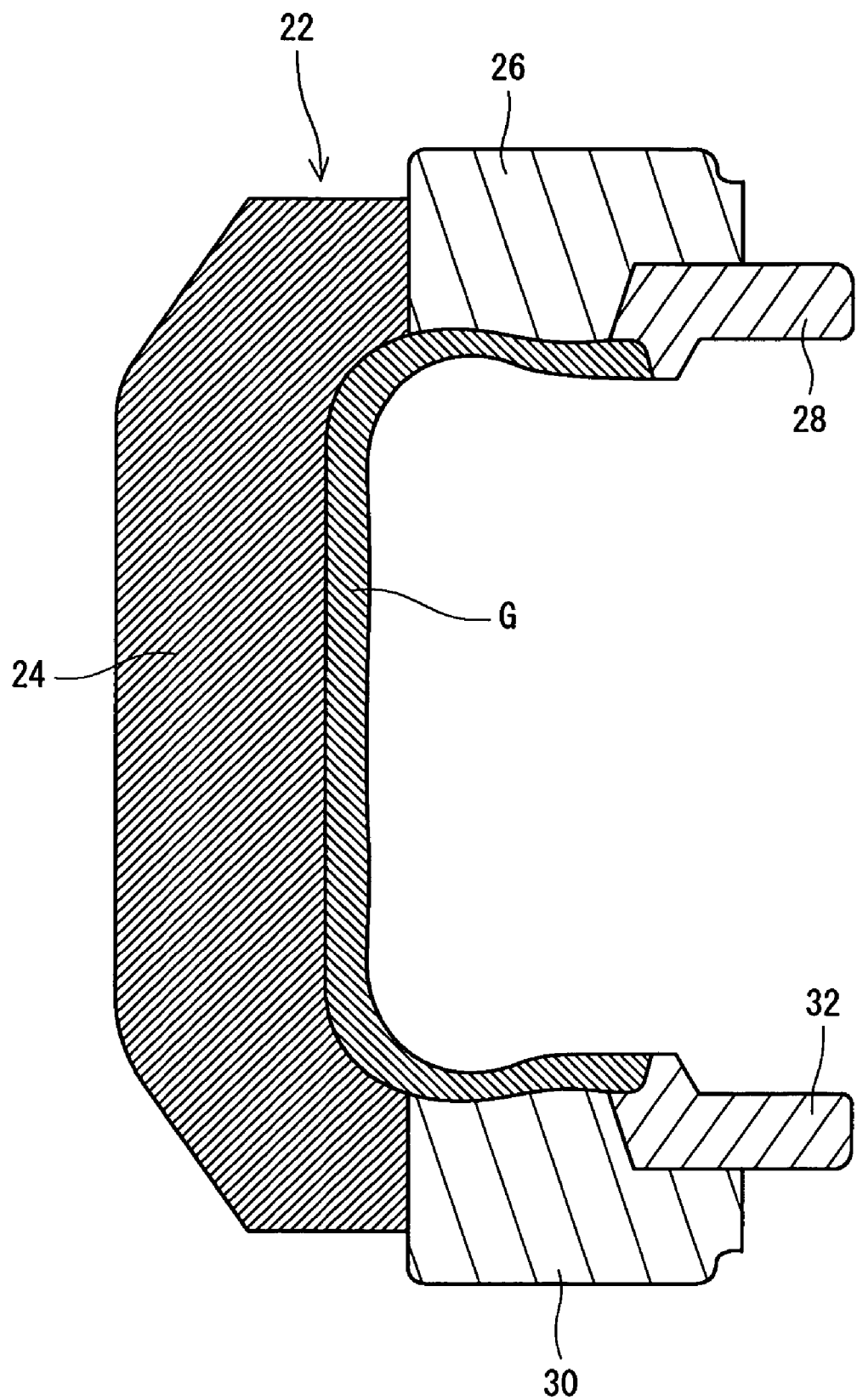
FIG. 2 is an enlarged sectional view taken along a II-II line in FIG. 1.

A mold 22 shown in FIGS. 1 and 2 comprises a large number of tread segments 24, an upper side plate 26, an upper bead ring 28, a lower side plate 30 and a lower bead ring 32. The tread segment 24 has a planar shape of a substantially circular arc. A large number of tread segments 24 are coupled like a ring. The upper side plate 26, the lower side plate 30, the upper bead ring 28 and the lower bead ring 32 are substantially ring-shaped. The number of the tread segments 24 is usually 3 to 20. The mold 22 is a so-called "two phase mold". FIG. 2 also shows a green tire G obtained immediately before the completion of a vulcanizing step.

Figure 3:
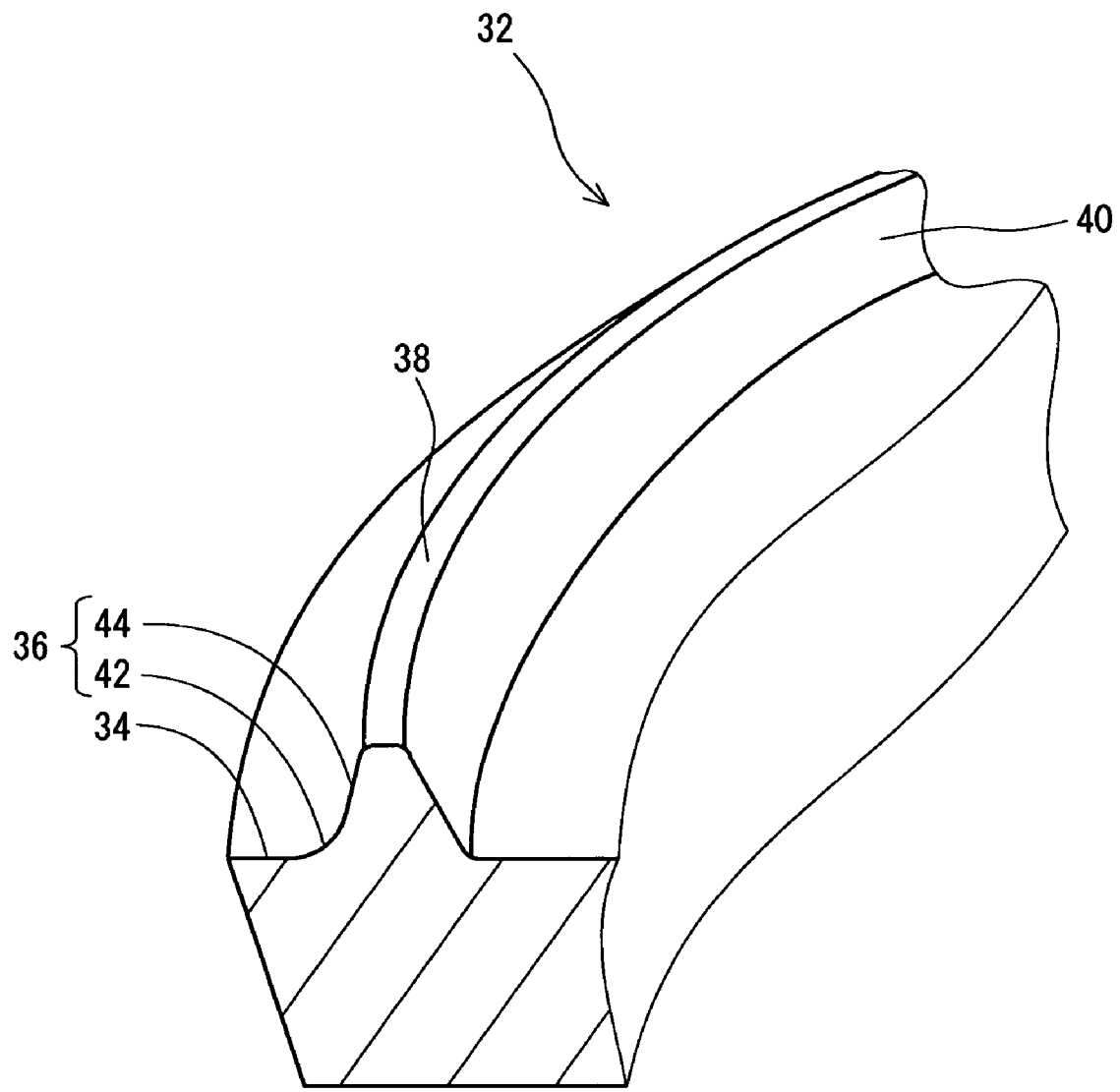
FIG. 3 is a sectional view showing a lower bead ring in FIG. 2, which is partially taken away.

In FIG. 3, a radial direction in a section of the lower bead ring 32 is shown in an arrow X. In FIG. 3, a right side indicates an inside in the radial direction and a left side indicates an outside in the radial direction. In FIG. 3, an axial direction in the section of the lower bead ring 32 is shown in an arrow Y. In FIG. 3, an upper side indicates an inside in the axial direction and a lower side indicates an outside in the axial direction. The lower bead ring 32 includes a side forming surface 34, a bottom forming surface 36, a support surface 38 for a bladder, and a guide surface 40 for a bladder. As is apparent from FIG. 2, the upper bead ring 28 also includes a side forming surface, a bottom forming surface, a support surface for a bladder and a guide surface for a bladder in the same manner as the lower bead ring 32.

The side forming surface 34 is almost parallel with the radial direction. The side forming surface 34 abuts on an external surface in the vicinity of an end E of the green tire G. By the side forming surface 34, a side of a bead of the tire is formed.

The bottom forming surface 36 is positioned on the inside in the radial direction of the side forming surface 34. The bottom forming surface 36 is generally inclined inward in the radial direction from the outside in the axial direction toward the inside in the axial direction. The bottom forming surface 36 is constituted by a curved portion 42 and a flat portion 44. The curved portion 42 is linked to the side forming surface 34. The flat portion 44 is linked to the curved portion 42.

The support surface 38 for a bladder is positioned on the inside in the radial direction of the bottom forming surface 36. The support surface 38 is linked to the bottom forming surface 36. The support surface 38 is extended in the radial direction. The support surface 38 may be slightly inclined with respect to the radial direction. In this case, it is preferable that an angle of the support surface 38 which is formed with respect to the radial direction should be equal to or smaller than 15 degrees.

The guide surface 40 for a bladder is positioned on the inside in the radial direction and the outside in the axial direction from the support surface 38. The guide surface 40 is linked to the support surface 38. The guide surface 40 is inclined inward in the axial direction from the inside in the radial direction toward the outside in the radial direction.

Figure 4:
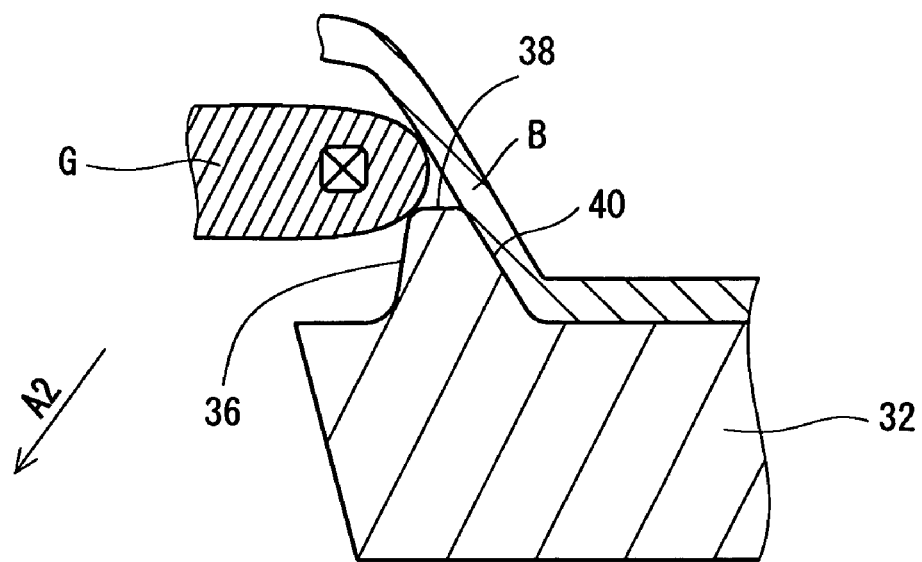
FIG. 4 is an enlarged sectional view showing the bead ring in FIG. 3 together with a green tire.
Figure 4:
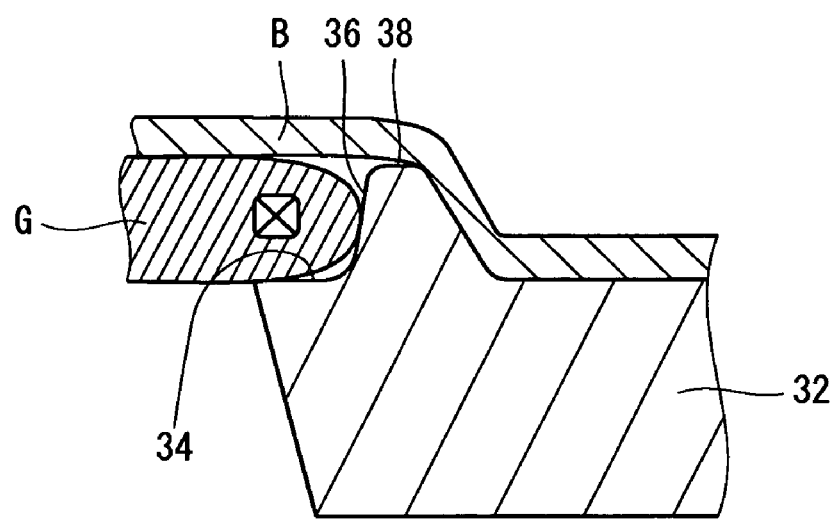

In a method of manufacturing a tire using the mold 22, first of all, the green tire G obtained by previous forming is put into the mold 20 in a state in which the mold 22 is opened and a bladder B contracts. Next, the bladder B is filled with a high-temperature gas. As shown in FIG. 4(a), the bladder B expands along the guide surface 40. The bladder B provided on the outside in the radial direction from the guide surface 40 is erected by the guide surface 40. In this state, the bladder B abuts on the green tire G. The bladder B abuts on the green tire G at a sufficient angle with respect to the green tire G. The green tire G is pushed in a direction of an arrow A2 by means of the bladder B and is thus fitted into the bottom forming surface 36. At this time, a rubber composition of the green tire G can be prevented from being interposed between the bladder B and the support surface 38.

Figure 5:
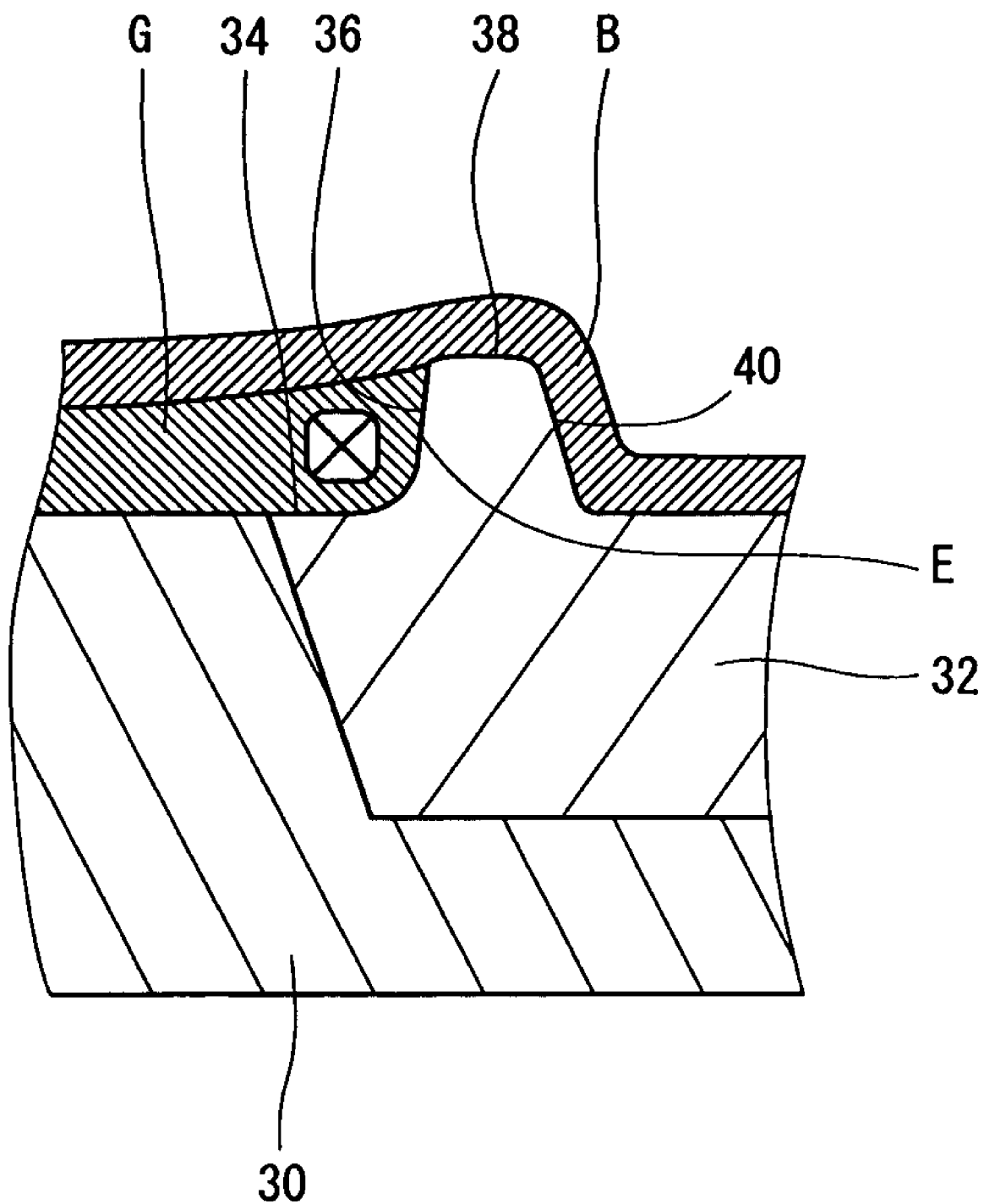
FIG. 5 is an enlarged sectional view showing the mold in FIG. 2 together with the green tire.

FIG. 4(b) shows a state in which the bladder B further expands. The bladder B is curved through the support surface 38. The support surface 38 supports the bladder B. The green tire G is pushed against the side forming surface 34 and the bottom forming surface 36 through the bladder B. The bladder B further expands so that the green tire G is also pushed against a cavity surface formed by the tread segment 24 (see FIG. 2) and the side plates 26 and 30. The green tire G is pressurized in the cavity surrounded by the mold 22 and the bladder B. At the same time, the green tire G is heated by a heat conduction from the high-temperature gas. By the pressurization and the heating, the rubber composition flows along the cavity surface. FIG. 5 shows the green tire G which is being subjected to a pressurizing step. The end E of the green tire G is surrounded by the bladder B, the bottom forming surface 36 and the side forming surface 34. By further heating, the rubber causes a crosslinking reaction so that the tire is obtained.

Figure 6:
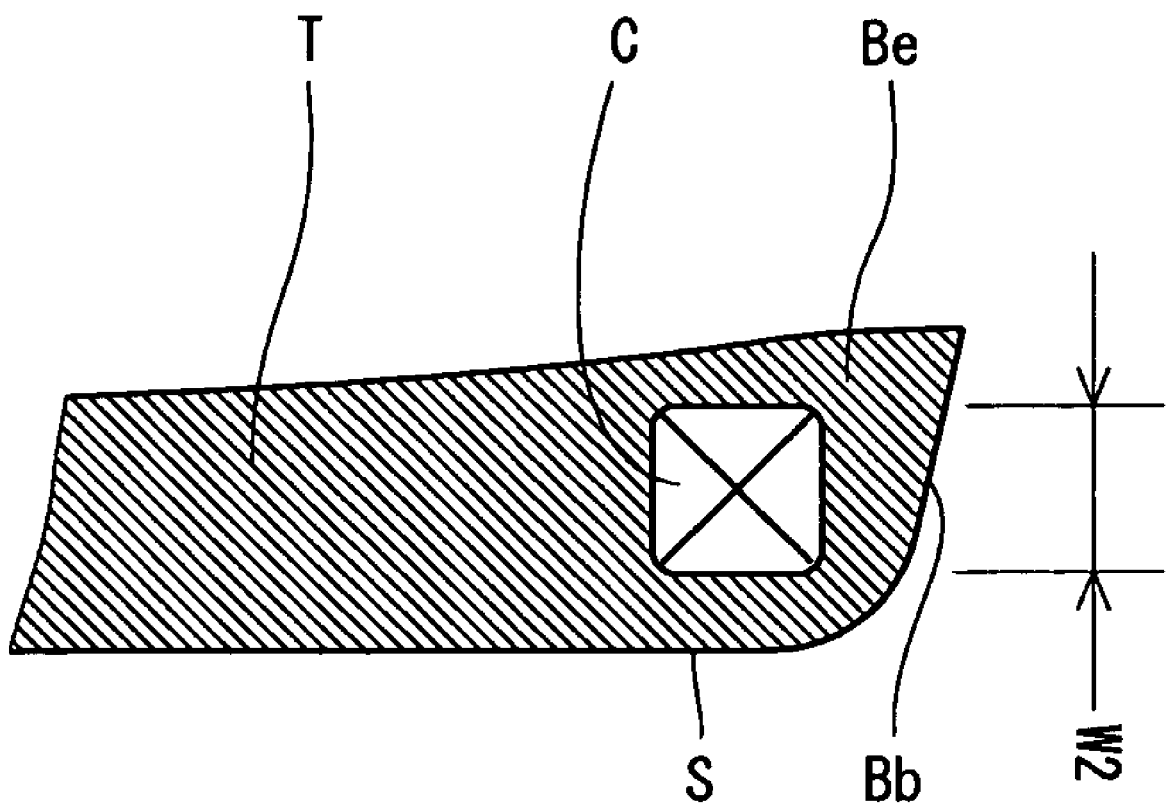
FIG. 6 is a sectional view showing a part of a tire obtained by the mold illustrated in FIGS. 1 to 5.

FIG. 6 is a sectional view showing a part of a tire T obtained by the mold 22 shown in FIGS. 1 to 5. FIG. 6 shows the vicinity of a bead Be. The bead Be includes a side portion S and a bead bottom Bb. A shape of the side portion S is determined by the side forming surface 34. A shape of the bead bottom Bb is determined by the bottom forming surface 36.

As described above, the bladder B is erected by the guide surface 40. The erected bladder B abuts on the green tire G so that the rubber composition can be prevented from being interposed between the support surface 38 and the bladder B. By using the mold 22, it is possible to prevent a long toe. In general, the long toe is generated unevenly in a circumferential direction. Therefore, a weight of the bead is caused to be nonuniform. By the mold 22 according to the present invention, the weight of the bead Be can be prevented from being nonuniform. The tire T obtained by the manufacturing method is excellent in a uniformity. If the mold 22 is used, it is not necessary to take a countermeasure for preventing the long toe in the green tire G. Therefore, a smash can also be suppressed. By the mold 22, it is possible to obtain the tire T of high quality. In the method of manufacturing the tire T, it is not necessary to carry out a work for removing a tongue-shaped portion. The manufacturing method is excellent in a productivity.

Figure 7:
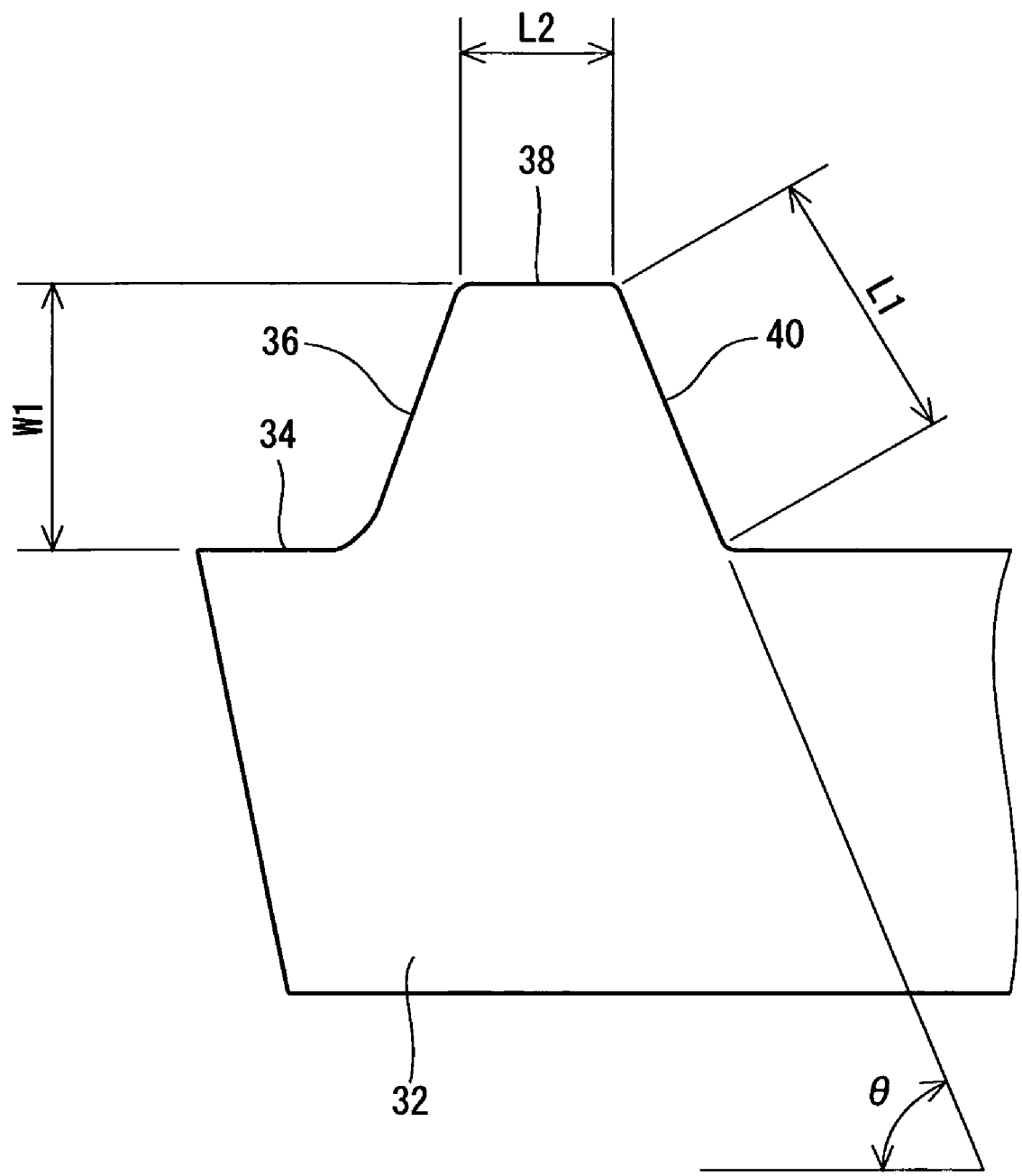
FIG. 7 is an enlarged sectional view showing the bead ring in FIG. 3.

FIG. 7 is an enlarged sectional view showing a part of the lower bead ring 32 in FIG. 3. In FIG. 7, an arrow $\theta$ indicates an angle of the guide surface 40 to the radial direction. It is preferable that the angle $\theta$ should be equal to or greater than 15 degrees and be equal to or smaller than 75 degrees. By setting the angle $\theta$ to be equal to or greater than 15 degrees, the bladder B is sufficiently erected so that the long toe can be suppressed. In respect of the suppression of the long toe, the angle $\theta$ is more preferably equal to or greater than 20 degrees and is particularly preferably equal to or greater than 25 degrees. By setting the angle $\theta$ to be equal to or smaller than 75 degrees, it is possible to prevent the bladder B from being damaged by the support surface 38. In respect of the prevention of the damage of the bladder B, the angle θ is more preferably equal to or smaller than 60 degrees and is particularly preferably equal to or smaller than 50 degrees.

In FIG. 7, an arrow L1 indicates a distance of the guide surface 40. By setting the sufficient distance L1, the bladder B is erected so that the long toe can be suppressed. From this viewpoint, the distance L1 is preferably equal to or greater than 5 mm and is more preferably equal to or greater than 10 mm. In respect of a durability of the bead rings 28 and 32, it is preferable that the distance L1 should be equal to or smaller than 30 mm.

In FIG. 7, an arrow L2 indicates a distance of the support surface 38 in the radial direction. If the distance L2 is excessively great, the bladder B is provided along the support surface 38 in an expanding process. Therefore, the bladder B having a low extent of erection abuts on the green tire G. In this case, the long toe is easily generated. In respect of the suppression of the long toe, it is preferable that the distance L2 should be smaller. The distance L2 is preferably equal to or smaller than 5.0 mm, is more preferably equal to or smaller than 3.0 mm, and is particularly preferably equal to or smaller than 2.0 mm. The distance L2 may be zero. In the case in which the distance L2 is zero, the bottom forming surface 36 and the guide surface 40 are adjacent to each other through a line. Theoretically, a width of the line is zero. In the actual mold 22, however, the support surface 38 having a slight width is inevitably formed. In respect of the prevention of the damage of the bladder B, the distance L2 is preferably equal to or greater than 0.1 mm and is more preferably equal to or greater than 0.5 mm.

In FIG. 7, an arrow W1 indicates a width of the bottom forming surface 36 in the axial direction. In FIG. 6, an arrow W2 indicates a width of a core in the axial direction. If the width W1 of the bottom forming surface 36 is smaller, the green tire G is easily fitted in the bead rings 28 and 32 when the green tire G is put into the mold 22. From this viewpoint, a ratio (W1/W2) of the width W1 to the width W2 is preferably equal to or lower than 2.5, is more preferably equal to or lower than 2.3, and is particularly preferably equal to or lower than 2.0. The ratio (W1/W2) is equal to or higher than 1.5.

In the present invention, the width W2 of the core is measured in a state in which the tire T is incorporated in a normal rim and is filled with air to obtain a normal internal pressure. During the measurement, a load is not applied to the tire T. In this specification, the normal rim implies a rim determined in rules on which the tire T depends. A "standard rim" in the JATMA rules, a "Design Rim" in the TRA rules and a "Measuring Rim" in the ETRTO rules are included in the normal rim. In this specification, the normal internal pressure implies an internal pressure determined in the rules on which the tire T depends. A "maximum air pressure" in the JATMA rules, a "maximum value" described in "TIRE LOAD LIMITS AT VARIOUS COLD INFLATION PRESSURES" in the TRA rules and an "INFLATION PRESSURE" in the ETRTO rules are included in the normal internal pressure. In the measurement, a load is not applied to the tire T.

Figure 9:
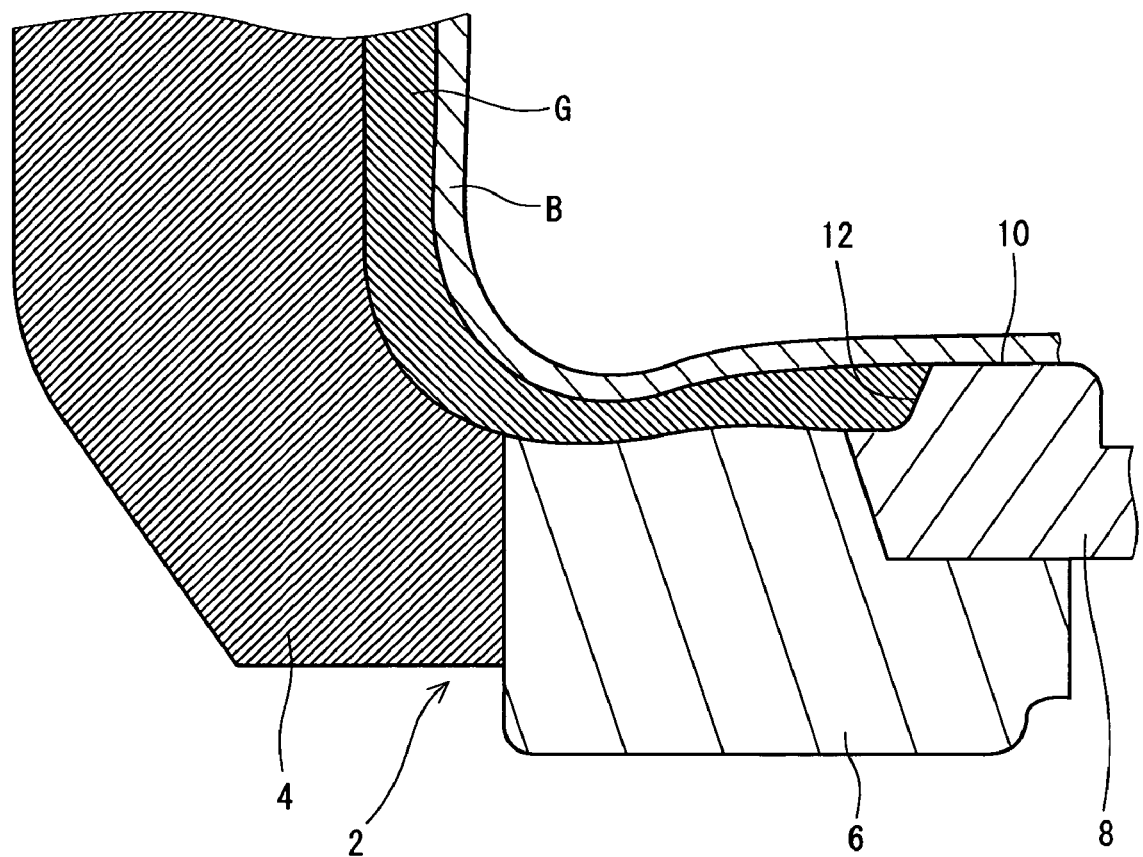
FIG. 9 is a sectional view showing a part of a conventional mold together with the green tire.

The bead ring including the guide surface 40 can be obtained by recycling the conventional bead ring 8 (see FIG. 9). More specifically, the inner peripheral surface 10 of the conventional bead ring 8 is cut so that the guide surface 40 is formed. The bead ring obtained by the recycling is inexpensive.

In a tire including a rubber chafer, the rubber composition flows violently. Therefore, the long toe is generated easily. The mold 22 according to the present invention is suitable for the tire including the rubber chafer. As a matter of course, the mold 22 can also be used for manufacturing a tire including a canvas chafer.

Figure 8:
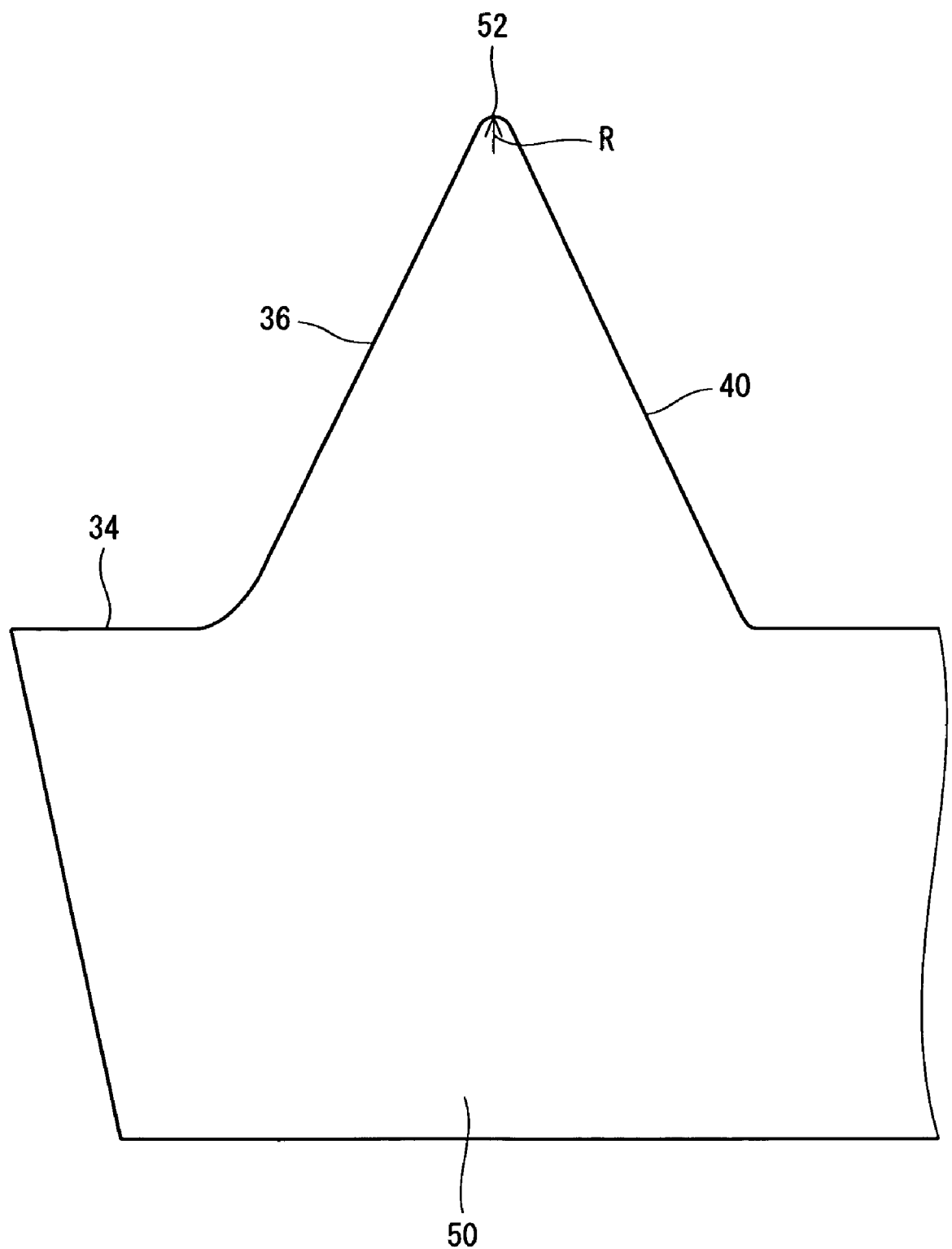
FIG. 8 is a sectional view showing a part of a mold according to another embodiment of the present invention.

FIG. 8 is a sectional view showing a part of a mold 48 according to another embodiment of the present invention. The mold 48 also comprises a large number of tread segments, an upper side plate, an upper bead ring, a lower side plate and a lower bead ring 50 in the same manner as the mold 22 shown in FIG. 2. FIG. 8 shows the lower bead ring 50.

The lower bead ring 50 includes a side forming surface 34, a bottom forming surface 36, a support surface 52 for a bladder, and a guide surface 40 for a bladder. The support surface 52 is rounded. A distance of the support surface 52 in a radial direction is theoretically zero. In an actual metal mold, the support surface 52 having a slight width is inevitably formed. Also in the mold 48, a bladder B is erected by the guide surface 40 and is supported by the support surface 52. Also in the mold 48, a long toe can be suppressed. In respect of the suppression of the long toe, a radius of curvature R of rounding is preferably equal to or smaller than 5.0 mm and is more preferably equal to or smaller than 2.0 mm. In respect of the prevention of a damage of the bladder B, the radius of curvature R is preferably equal to or greater than 0.1 mm, is more preferably equal to or greater than 0.5 mm and is particularly preferably equal to or greater than 1.0 mm.

EXAMPLES

Example 1

There was prepared the mold having the shape shown in FIGS. 1 to 5 and FIG. 7. In the mold, a distance L2 of a support surface is 3.0 mm in a radial direction, an angle θ of a guide surface is 45 degrees, and a width W1 of a bottom forming surface is 21.0 mm. A green tire was put into the mold, and pressurization and heating were carried out to obtain a tire. The tire has a size of "195/75R15". A core of the tire has a width W2 of 10.0 mm. Accordingly, a ratio (W1/W2) is 2.1.

Example 2

A tire was obtained in the same manner as that in the example 1 except that the mold shown in FIG. 8 was used. A support surface of the mold is rounded. A radius of curvature R of rounding is 0.5 mm. A distance L2 of the support surface is theoretically zero in a radial direction.

Examples 3 to 5 and Comparative Examples 1 to 3

A tire was obtained in the same manner as that in the example 1 except that a mold having a distance L2 shown in the following Table 1 was used.

Examples 6 to 13

A tire was obtained in the same manner as that in the example 1 except that a mold having an angle θ shown in the following Table 2 was used.

Examples 14 to 17

A tire was obtained in the same manner as that in the example 1 except that a mold having a width W1 of a bottom forming surface was used.

Conventional Example

Figure 10:
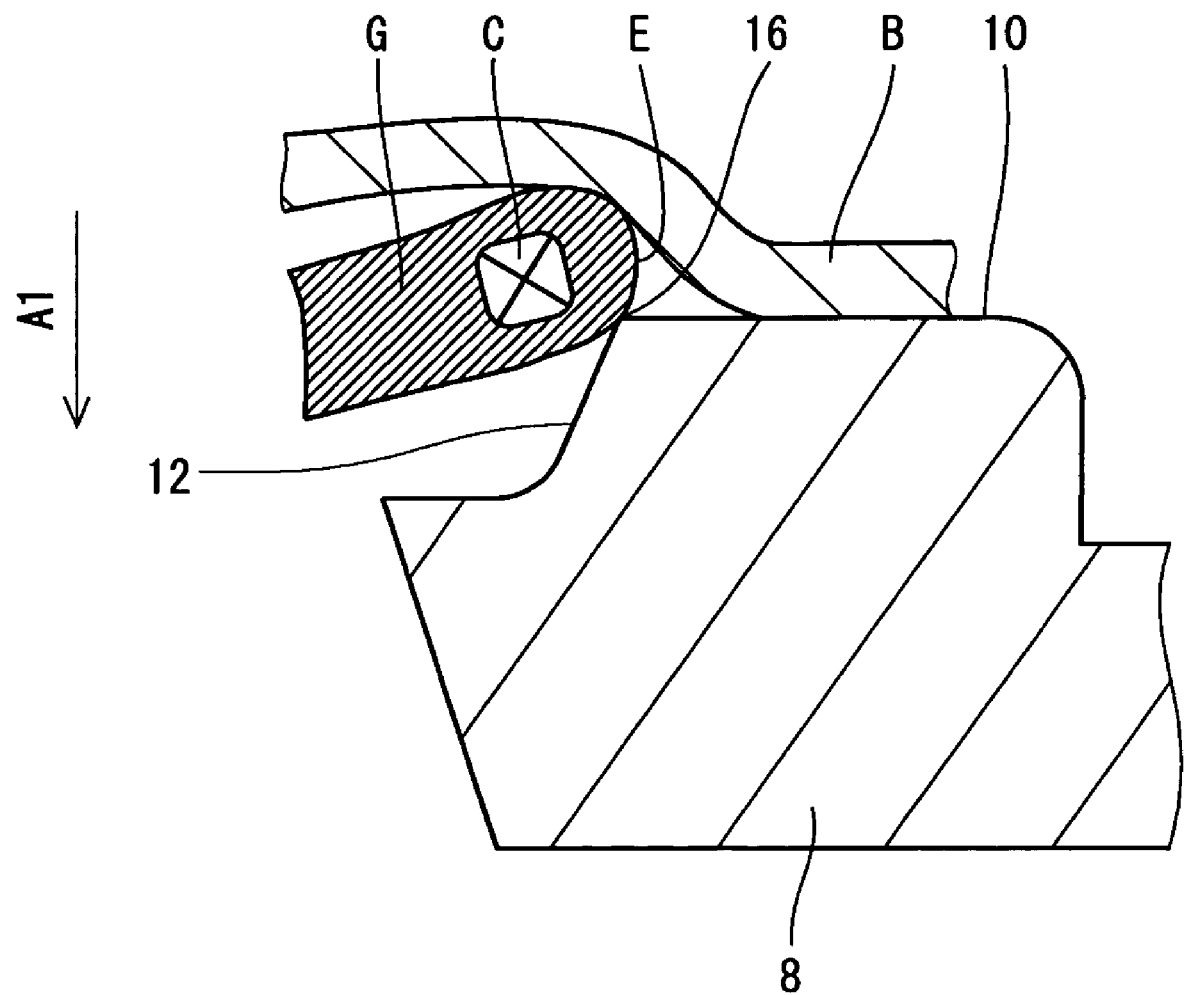
FIG. 10 is an enlarged sectional view showing a part of the mold in FIG. 9 together with the green tire.
Figure 11:
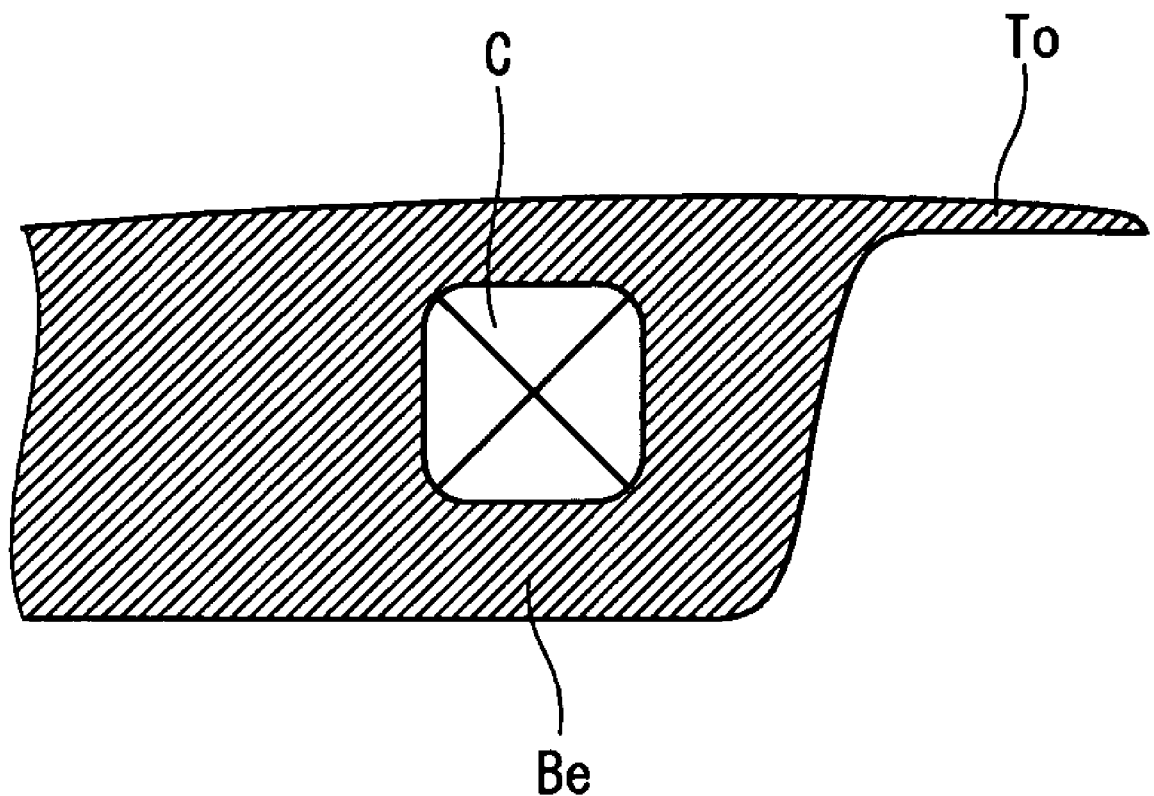
FIG. 11 is a sectional view showing a part of a tire obtained by the mold in FIG. 9.

A tire was obtained in the same manner as that in the example 1 except that the mold shown in FIGS. 9 and 10 was used. The mold includes neither a support surface nor a guide surface.

[Observation of Appearance]

An appearance of a bead was observed visually. The result is shown in the following Tables 1 to 3.

[Measurement of RFV]

RFV was measured in accordance with the condition of a uniformity test specified in "JASO C607:2000". A mean value of a result obtained by measuring twenty tires is shown in the following Tables 1 to 3.

TABLE 1

| | Result of evaluation | | | | | | | |
|---|---|---|---|---|---|---|---|---|
| | Example 2 | Example 3 | Example 1 | Example 4 | Example 5 | Compara. example 1 | Compara. example 2 | Compara. example 3 |
| Distance L2 of support surface in radial direction (mm) | 0 | 2.0 | 3.0 | 4.0 | 5.0 | 6.0 | 8.0 | 10.0 |
| Angle θ of guide surface (degree) | 45 | 45 | 45 | 45 | 45 | 45 | 45 | 45 |
| Ratio (W1/W2) | 2.1 | 2.1 | 2.1 | 2.1 | 2.1 | 2.1 | 2.1 | 2.1 |
| Appearance of tire | Excellent | Excellent | Excellent | Excellent | Excellent | Excellent | Excellent | Long toe (Small) |
| RFV (N) | 63 | 65 | 69 | 73 | 80 | 83 | 84 | 86 |

TABLE 2

| | Result of evaluation | | | | | | | |
|---|---|---|---|---|---|---|---|---|
| | Example 6 | Example 7 | Example 8 | Example 9 | Example 10 | Example 11 | Example 12 | Example 13 |
| Distance L2 of support surface in radial direction (mm) | 3.0 | 3.0 | 3.0 | 3.0 | 3.0 | 3.0 | 3.0 | 3.0 |
| Angle θ of guide surface (degree) | 10 | 20 | 30 | 50 | 60 | 70 | 80 | 90 |
| Ratio (W1/W2) | 2.1 | 2.1 | 2.1 | 2.1 | 2.1 | 2.1 | 2.1 | 2.1 |
| Appearance of tire | Long toe (Large) Smash (Small) | Smash (Small) | Excellent | Excellent | Excellent | Smash (Small) | Smash (Small) | Long toe (Small) Smash (Small) |
| RFV (N) | 85 | 85 | 83 | 80 | 84 | 86 | 89 | 89 |

TABLE 3

| | Result of evaluation | | | | |
|---|---|---|---|---|---|
| | Example 14 | Example 15 | Example 16 | Example 17 | Conventional example |
| Distance L2 of support surface in radial direction (mm) | 3.0 | 3.0 | 3.0 | 3.0 | — |
| Angle θ of guide surface (degree) | 45 | 45 | 45 | 45 | — |
| Ratio (W1/W2) | 1.5 | 1.7 | 1.9 | 2.6 | 2.6 |
| Appearance of tire | Excellent | Excellent | Excellent | Excellent | Long toe (Large) Smash (Large) |
| RFV (N) | 63 | 63 | 65 | 73 | 85 |

As is apparent from the Tables 1 to 3, a defect is generated with difficulty in the molds according to the examples. From the result of the evaluation, the advantages of the present invention are apparent.

The bead ring comprising the support surface and the guide surface is not restricted to the two phase mold but can also be applied to a two piece mold. The above description is only illustrative and various changes can be made without departing from the scope of the present invention.

What is claimed is:

1. A mold for a tire comprising a bead ring for vulcanizing and forming a bead of a tire, the bead ring including:
   a bottom forming surface for abutting on a bead bottom to determine a shape of the bead bottom;
   a support surface for a bladder which is positioned on an inside in a radial direction from the bottom forming surface and extended in the radial direction, a distance of the support surface in the radial direction being equal to or greater than 0.5 mm and equal to or smaller than 5 mm; and
   a guide surface for the bladder which is positioned on an inside in the radial direction and an outside in an axial direction from the support surface, the guide surface being flat and linked to the support surface and inclined axially inwardly and radially outwardly, and angle of the guide surface to the radial direction being equal to or greater than 20 degrees and equal to or smaller than 70 degrees, and a distance of the guide surface being equal to or greater than 5 mm.

2. The mold according to claim 1, wherein a ratio (W1/W2) of a width W1 of the bottom forming surface to a width W2 of a core of the bead is equal to or lower than 2.5 in the axial direction.

3. A method of manufacturing a tire comprising the steps of:
   putting a green tire into a mold including a bead ring having
      a bottom forming surface for abutting on a bead bottom to determine a shape of the bead bottom,
      a support surface for a bladder which is positioned on an inside in a radial direction from the bottom forming surface and extended in the radial direction, a distance of the support surface in the radial direction being equal to or greater than 0.5 mm and equal to or smaller than 5 mm, and
      a guide surface for the bladder which is positioned on an inside in the radial direction and an outside in an axial direction from the support surface, the guide surface being flat and linked to the support surface and inclined axially inwardly and radially outwardly, an angle of the guide surface to the radial direction being equal to or greater than 20 degrees and equal to or smaller than 70 degrees, and a distance of the guide surface being equal to or greater than 5 mm; and
   pressurizing and heating the green tire in a cavity surrounded by the mold and the bladder, thereby forming a bead through the bead ring.

* * * * *